US012640280B2

(12) United States Patent
Yoon et al.

(10) Patent No.: US 12,640,280 B2
(45) Date of Patent: May 26, 2026

(54) BUSBAR AND METHOD OF MANUFACTURING BUSBAR

(71) Applicant: FURUKAWA ELECTRIC CO., LTD., Tokyo (JP)

(72) Inventors: Daeyoul Yoon, Tokyo (JP); Kazuyuki Umeno, Tokyo (JP); Masamitsu Kaneko, Tokyo (JP); Jun Terada, Tokyo (JP); Fumika Nishino, Tokyo (JP); Nobuyasu Matsumoto, Tokyo (JP); Tomomichi Yasuoka, Tokyo (JP); Jiang Li, Shiga (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 290 days.

(21) Appl. No.: 18/061,535

(22) Filed: Dec. 5, 2022

(65) Prior Publication Data

US 2023/0096039 A1     Mar. 30, 2023

Related U.S. Application Data

(63) Continuation of application No. PCT/JP2021/023998, filed on Jun. 24, 2021.

(30) Foreign Application Priority Data

Jun. 25, 2020     (JP) ................................. 2020-109783

(51) Int. Cl.
H01B 5/02         (2006.01)
B23K 26/03        (2006.01)
(Continued)

(52) U.S. Cl.
CPC .............. H01B 5/02 (2013.01); B23K 26/032 (2013.01); B23K 26/067 (2013.01); (Continued)

(58) Field of Classification Search
CPC ...... H01B 5/02; B23K 26/032; B23K 26/242; B23K 26/32; H01R 4/02; H01R 4/029 (Continued)

(56) References Cited

U.S. PATENT DOCUMENTS

2017/0095886 A1*  4/2017  Gu ....................... B23K 26/361
2020/0306854 A1   10/2020 Yomogida et al.

FOREIGN PATENT DOCUMENTS

JP          57-35018 U       8/1980
JP          62-289390 A      12/1987
                  (Continued)

OTHER PUBLICATIONS

Japanese Office Action issued Dec. 6, 2022 in Japanese Patent Application No. 2022-532543 (with unedited computer-generated English Translation), 6 pages.
(Continued)

*Primary Examiner* — Tremesha W Burns
(74) *Attorney, Agent, or Firm* — Oblon, McClelland, Maier & Neustadt, L.L.P.

(57) ABSTRACT

A busbar includes: a plurality of members that are platy; and a welding area in which two of the members are welded, the welding area being linear and extending in a first direction, the welding area being provided approximately between both ends of at least one of the two members in the first direction.

9 Claims, 8 Drawing Sheets

(51) Int. Cl.

| | |
|---|---|
| *B23K 26/067* | (2006.01) |
| *B23K 26/322* | (2014.01) |
| *H01B 13/00* | (2006.01) |
| *H01R 4/02* | (2006.01) |
| *H01R 4/58* | (2006.01) |
| *H01R 43/02* | (2006.01) |
| *B23K 26/38* | (2014.01) |
| *B23K 101/34* | (2006.01) |
| *B23K 103/10* | (2006.01) |
| *B23K 103/12* | (2006.01) |

(52) U.S. Cl.
CPC ......... *B23K 26/322* (2013.01); *H01B 13/003* (2013.01); *H01R 4/02* (2013.01); *H01R 4/58* (2013.01); *H01R 43/02* (2013.01); *B23K 26/38* (2013.01); *B23K 2101/34* (2018.08); *B23K 2103/10* (2018.08); *B23K 2103/12* (2018.08)

(58) Field of Classification Search
USPC ........................................................ 174/68.2
See application file for complete search history.

(56) References Cited

FOREIGN PATENT DOCUMENTS

| | | | |
|---|---|---|---|
| JP | | 2-292892 A | 12/1990 |
| JP | | 11-297372 A | 10/1999 |
| JP | | 2001-321973 A | 11/2001 |
| JP | | 2002-316282 A | 10/2002 |
| JP | | 2006-297464 A | 11/2006 |
| JP | | 2007-319878 A | 12/2007 |
| JP | | 2015-104280 A | 6/2015 |
| JP | | 2017-116461 A | 6/2017 |
| JP | | 2017-123318 A | 7/2017 |
| JP | | 2019-25520 A | 2/2019 |
| WO | WO-2018/159857 A1 | | 9/2018 |

OTHER PUBLICATIONS

International Search Report issued Sep. 7, 2021 in PCT/JP2021/023998 filed on Jun. 24, 2021, 2 pages.

Japanese Office Action issued May 7, 2025 in Japanese Patent Application No. 2023-126453 (with unedited computer-generated English translation), 6 pages.

Combined Chinese Office Action and Search Report issued Aug. 19, 2025 in Chinese Patent Application No. 202180042706.2 (with unedited computer-generated English translation of Office Action only), 14 pages.

Japanese Office Action issued Dec. 16, 2025 in Japanese Patent Application No. 2023-126453, 9 pages.

* cited by examiner

10

11

11

14-6
(14)

14-5
(14)

D3
D1
D2

BUSBAR AND METHOD OF MANUFACTURING BUSBAR

CROSS-REFERENCE TO RELATED APPLICATION(S)

This application is a continuation of International Application No. PCT/JP2021/023998, filed on Jun. 24, 2021 which claims the benefit of priority of the prior Japanese Patent Application No. 2020-109783, filed on Jun. 25, 2020, the entire contents of which are incorporated herein by reference.

BACKGROUND

1. Technical Field

The present disclosure relates to a busbar and a method of manufacturing a busbar.

2. Related Art

Busbars formed by connecting a plurality of members at points of contact by spot welding have been known (for example, Japanese Laid-open Patent Publication No. 11-297372).

In spot welding however, for example, the joint strength between a plurality of members is sometimes insufficient.

An object of the disclosure is to obtain a busbar having a much improved and novel configuration like a busbar obtained by joining a plurality of members by welding enabling a higher joint strength and a method of manufacturing the busbar.

SUMMARY

In some embodiments, a busbar includes: a plurality of members that are platy; and a welding area in which two of the members are welded, the welding area being linear and extending in a first direction, the welding area being provided approximately between both ends of at least one of the two members in the first direction.

In some embodiments, provided is a method of manufacturing a busbar including a plurality of members that are platy and a welding area in which two of the members are welded, the welding area being linear and extending in a first direction. The method includes: forming the welding area by application of a laser light including a plurality of beams.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
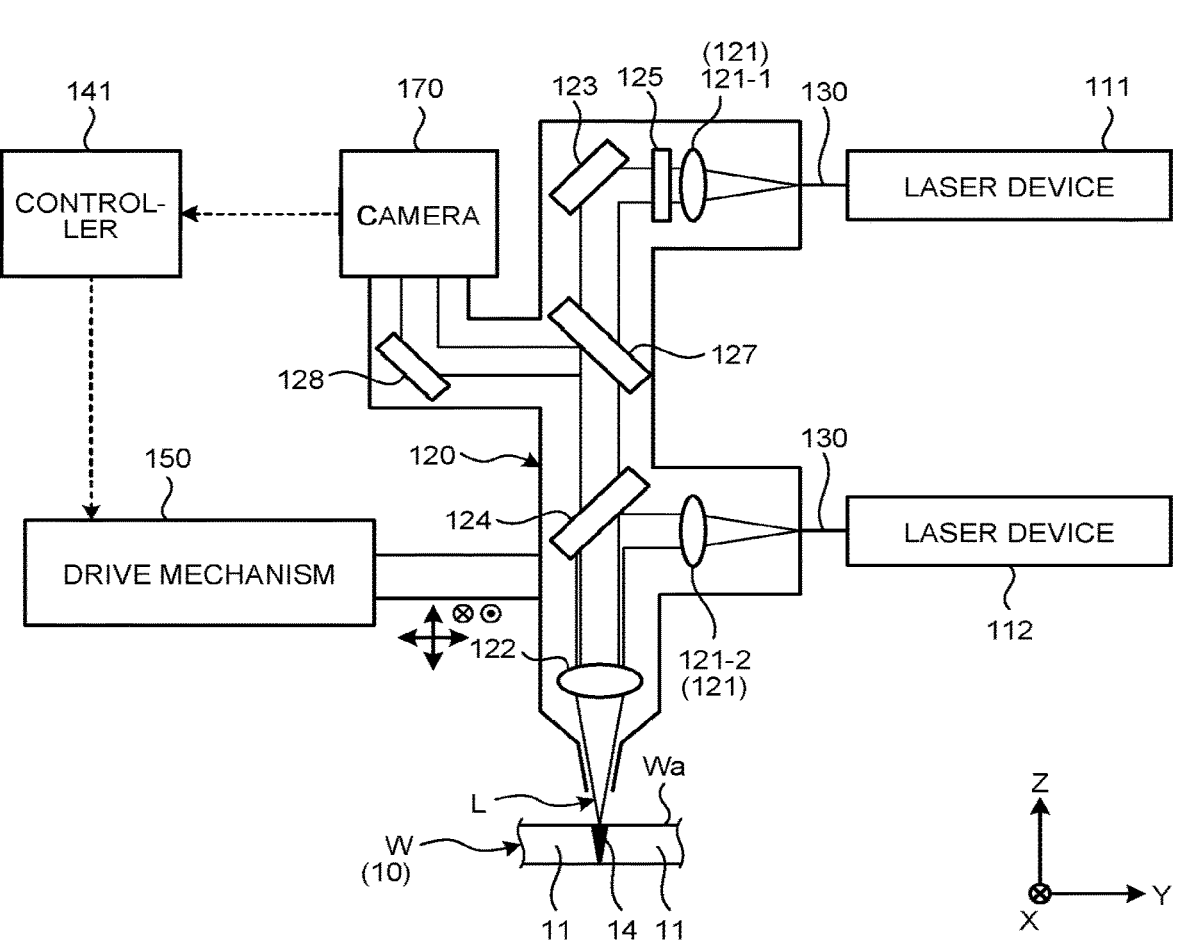
FIG. 1 is an illustrative schematic configuration diagram of a laser welding device of an embodiment.

Illustrative embodiments of the present disclosure will be disclosed below. The configurations and the functions and results (effects) that are brought by the configurations are an example. The disclosure can be also realized by configurations other than those disclosed in the following embodiments. According to the disclosure, it is possible to obtain at least one of various effects (including derivative effects) obtained with the configurations.

The embodiments illustrated below have similar configurations. Thus, according to the configuration of each embodiment, it is possible to obtain similar functions and effects based on the similar configuration. The same reference numerals are assigned to those similar configurations below and redundant descriptions may be omitted below.

In each drawing, an X-direction is represented by an arrow X, a Y-direction is represented by an arrow Y, and a Z-direction is represented by an arrow Z. The X-direction, the Y-direction, and the Z-direction intersect with and are orthogonal to one another. Each of the drawings illustrates, for convenience, an example in which a sweep direction SD of a laser light L on a surface Wa is along the X-direction; however, the sweep direction SD only need be along the surface Wa and intersect with the Z-direction and thus is not along only the X-direction.

Figure 2:
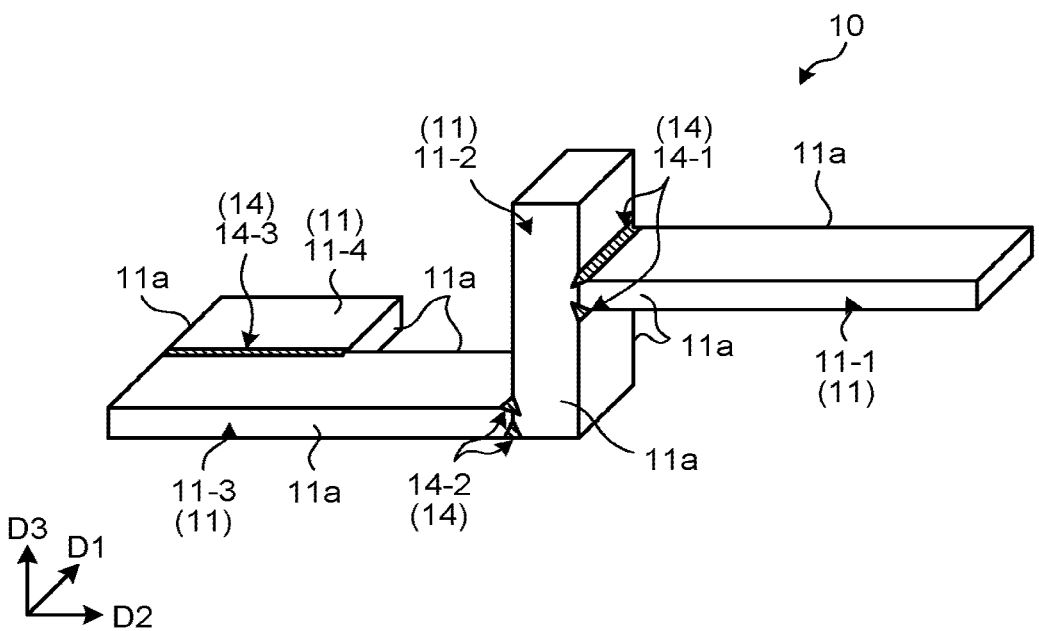
FIG. 2 is a schematic perspective view of an example of a busbar serving as an object to be processed by the laser welding device of the embodiment.
Figure 3:
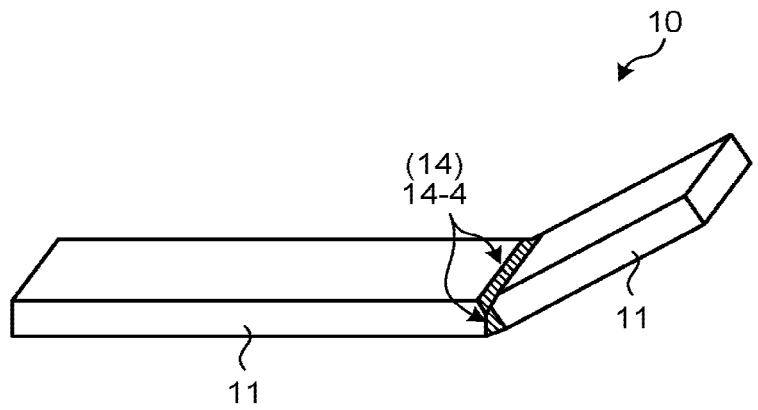
FIG. 3 is a schematic perspective view of an example of the busbar serving as the object to be processed by the laser welding device of the embodiment.
Figure 3:
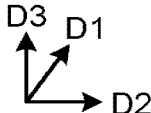
Figure 4:
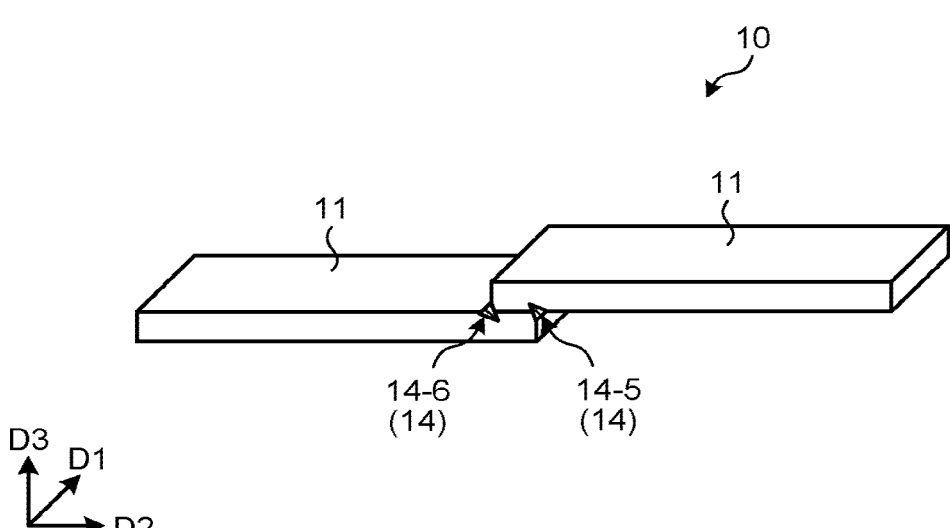
FIG. 4 is a schematic perspective view of an example of the busbar serving as the object to be processed by the laser welding device of the embodiment.

In FIGS. 2 to 4, a D1-direction, a D2-direction, and a D3-direction for representing the directions of a busbar 10, a member 11, and a welding area 14 are represented by an arrow D1, an arrow D2, and an arrow D3. The D1-direction, the D2-direction, and the D3-direction intersect with one another and are orthogonal to one another.

The ordinal numbers are assigned herein for convenience to distinguish the parts, members, sites, laser light, directions, etc., and do not represent the priorities or order.

First Embodiment

FIG. 1 is a schematic configuration diagram of a laser processing device 100. As illustrated in FIG. 1, the laser processing device 100 includes a laser device 111, a laser device 112, an optical head 120, an optical fiber 130, and a controller 141.

Each of the laser devices 111 and 112 includes a laser emitter and, for example, is configured to be capable of outputting laser light of a power of a few kW. The laser devices 111 and 112 may be configured to include, for example, a plurality of semiconductor laser elements inside and output multimode laser light of a power of a few kW as a total output of the semiconductor laser elements. The laser devices 112 and 112 may include various laser light sources, such as a fiber laser, a YAG laser, and a disc laser.

The laser device 111 outputs a first laser light having a wavelength between 800 [nm] and 1200 [nm] inclusive. The laser device 111 is an example of a first laser device. The laser emitter that the laser device 111 includes is an example of a first laser emitter.

On the other hand, the laser device 112 outputs a second laser light having a wavelength equal to or smaller than 550 [nm]. The laser device 112 is an example of a second laser device. The laser device 112 preferably outputs the second laser light having a wavelength between 400 [nm] and 500 [nm] inclusive. The laser emitter that the laser device 112 includes is an example of a second laser emitter.

The optical fiber 130 guides the laser lights that are output from the laser devices 111 and 112 to the optical head 120.

The optical head 120 is an optical device for applying the laser lights that are input from the laser devices 111 and 112 to a workpiece W. The optical head 120 includes a collimating lens 121, a condenser lens 122, a mirror 123, and a filter 124. The collimating lens 121, the condenser lens 122, the mirror 123, and the filter 124 can be also referred to as optical parts.

The optical head 120 is configured such that the relative position to the workpiece W is changeable in order to cause the laser light L to sweep on the surface Wa of the workpiece W while applying the laser light L. The relative displacement of the optical head 120 and the workpiece W can be realized by displacement of the optical head 120, displacement of the workpiece W, or displacement of both the optical head 120 and the workpiece W.

Note that the optical head 120 may include a galvano scanner (not illustrated in the drawing) and thus be configured to be capable of causing the laser light L to sweep on the surface Wa.

Each of the collimating lenses 121 (121-1 and 121-2) collimates the laser light that is input via the optical fiber 130. The collimated laser light becomes a parallel light.

The mirror 123 reflects the first laser light that has become the parallel light at the collimating lens 121-1. The first laser light that is reflected off the mirror 123 travels in a direction opposite to the Z-direction toward the filter 124. The mirror 123 is unnecessary in the configuration in which the first laser light travels in the direction opposite to the Z-direction at the optical head 120.

The filter 124 is a high-pass filter that transmits the first laser light and does not transmit and reflects the second laser light. The first laser light passes through the filter 124 and travels in the direction opposite to the Z-direction toward the condenser lens 122. On the other hand, the filter 124 reflects the second laser light having become parallel light at the collimating lens 121-2. The second laser light having been reflected off the filter 124 travels in the direction opposite to the Z-direction toward the condenser lens 122.

The condenser lens 122 converges the first laser light and the second laser light serving as the parallel light and applies the converged laser light as the laser light L (output light) to the workpiece W.

The laser processing device 100 includes the controller 141 and a drive mechanism 150 whose operations are controlled by the controller 141.

The drive mechanism 150 changes the relative position of the optical head 120 to the workpiece W. The drive mechanism 150 includes, for example, a rotary mechanism, such as a motor, a deceleration mechanism that reduces the rotation output of the rotary mechanism by deceleration, a motion conversion mechanism that linearly converts the rotation that is reduced by the deceleration mechanism, etc. The controller 141 is able to control the drive mechanism 150 such that the relative position of the optical head 120 to the workpiece W in the X-direction, the Y-direction, and the Z-direction changes.

The controller 141 may control, for example, switching between operating and stopping operating the laser devices 111 and 112 and the power of the laser lights that are emitted by the laser devices 111 and 112. If the laser processing device 100 includes a gas supply mechanism (not illustrated in the drawings) that supplies a gas, such as an inertia gas, to the surface Wa of the workpiece W, the controller 141 may control the gas supply mechanism to switch between supplying and stopping supplying the gas or changing the flow of the gas to be discharged.

The laser processing device 100 includes a camera 170 and a filter 127 and a mirror 128 that serve as optical members that guide light to the camera 170. The filter 127 is provided between the mirror 123 and the filter 124. The filter 127 transmits the first laser light from the mirror 123 to the filter 124 and reflects the light from the surface Wa (for example, visible light) to the mirror 128. The light that is reflected off the mirror 128 is input to the camera 170. Such a configuration enables the camera 170 to capture an image on the surface of the surface Wa. The image captured by the camera 170 can contain, for example, an image of the surface Wa and an image of the beam (spot) resulting from the laser light L. Thus, the image captured by the camera 170 can be referred to as the result of detection of a shift of the spot with respect to a given position that is formed on the surface Wa and the camera 170 can be referred to as an example of a sensor that detects the shift. When the position of the spot in the angle of view of the captured image is fixed, the captured image only need to contain a target to which the laser light L is applied and need not contain the image of the spot.

The controller 141 is able to control the drive mechanism 150 to detect the shift of the spot with respect to the given position from the image captured by the camera 170 and correct the shift. The controller 141 may execute feedback control of executing control such that the shift is at or under a threshold. In this case, the controller 141 and the drive mechanism 150 are an example of a correction mechanism. Such a configuration enables an increase in accuracy of the position of application of laser light.

As illustrated in FIG. 1, the laser processing device 100 applies the laser light L to a point of contact between two members 11 to weld the two members 11. FIG. 1 illustrates only one spot in which the two of a plurality of members 11 configuring the busbar 10 are welded using the welding area 14. Each of the members 11 included by the busbar 10 is made of a metal material having conductivity. The member 11 can be also referred to as a metal member or a conductor. Each welding area 14 mechanically and electrically connects two members 11. Each welding area 14 connects a plurality of members 11, so that the busbar 10 is formed.

In the example in FIG. 1, the two members 11 are arranged in the Y-direction. Facets of the two members in the Z-direction are arranged flush in the Y-direction and forms the surface Wa of the workpiece W. The surface Wa spreads orthogonally to the Z-direction and faces the optical head 120. The laser light L that is emitted from the optical head 120 travels in the direction opposite to the Z-direction and is applied to the surface Wa. The welding area 14 extends from the surface Wa in the direction opposite to the Z-direction. In the example, the direction of the depth of the welding area 14 is the direction opposite to the Z-direction. According to FIG. 1, for example, the surface Wa is a plane surface and the surface Wa may be a stepped surface. The surface Wa may be a convex surface, a concave surface, or the like.

The laser light L is caused to sweep on the surface Wa in the sweep direction SD (the X-direction at the site illustrated in FIG. 1) and accordingly the welding area 14 extends also in the sweep direction SD in a cross-sectional shape approximately similar to that in FIG. 1. The sweep direction SD is also referred to as a direction of extension of the welding area 14 or a longitudinal direction of the welding area 14 and is an example of a first direction. The direction orthogonal to the Z-direction and the sweep direction SD (the Y-direction at the site illustrated in FIG. 1) is also referred to as the width direction of the welding area 14.

The laser processing device 100 of the present embodiment is capable of applying the laser light L containing the first laser light and the second laser light to the workpiece W, is able to apply the laser light L containing only the first laser light, and is able to apply the laser light L containing only the second laser light. The laser device 112 does not operate when only the first laser light is applied and the laser device 111 does not operate when only the second laser light is applied. The laser processing device 100 may be a device capable of applying only the first laser light without the laser device 112, the collimating lens 121-2, the filter 124, etc., or may be a device capable of applying only the second laser light without the laser device 111, the collimating lens 121-1, the mirror 123, etc.

FIGS. 2 to 4 are perspective views of the busbar 10 that is made by the laser processing device 100. In the examples illustrated in FIGS. 2 to 4, all the members 11 forming the busbar 10 have a rectangular shape or a plane shape. Thus, it is possible to obtain the members 11 more easily. Note that the members 11 are not limited to such shapes.

The busbar 10 that is exemplified in FIG. 2 includes four platy members 11 that are welded using the welding areas 14 (14-1, 14-2 and 14-3). Each of the welding areas 14 welds two members 11.

The welding areas 14-1 weld two members 11-1 and 11-2. The member 11-1 extends in the D1-direction and the D2-direction and the member 11-2 extends in the D1-direction and the D3-direction. The members 11-1 and 11-2 intersect with each other and are orthogonal to each other. The welding areas 14-1 extend linearly in the D1-direction at corners in two spots that are formed by pushing the members 11-1 and 11-2 against each other and that extend in the D1-direction. In the welding area 14-1, the D1-direction is a width direction of the members 11-1 and 11-2. In welding in the welding area 14-1, the laser light L is applied to the corners and is caused to sweep in the D1-direction. Each of the welding areas 14-1 is provided approximately between both ends of each of the member 11-1 and the member 11-2 in the D1-direction, that is, approximately between one end 11a and another end 11a of each of the member 11-1 and the member 11-2 in the D1-direction. Note that the welding areas 14-1 are two welding areas and are provided on both sides in the thickness direction of the member 11-1; however, the welding areas are not limited to this, and only any one of the tow welding areas 14-1 may be provided. When the welding areas 14-1 are provided on both sides in the thickness direction, the joint strength is higher than that in the case where the welding area 14-1 is provided on only one side in the thickness direction and the electric resistance can be further reduced. The two welding areas 14-1 may overlap each other. In the welding area 14-1, the D1-direction is an example of the first direction, the D2-direction is an example of a second direction, and the D3-direction is an example of a third direction.

The welding areas 14-2 weld two members 11-2 and 11-3 are welded. The member 11-2 extends in the D1-direction and the D3-direction and the member 11-3 extends in the D1-direction and the D2-direction. The members 11-2 and 11-3 intersect with each other and are orthogonal to each other. The welding area 14-2 extends linearly in the D1-direction at a corner that is formed by pushing the members 11-2 and 11-3 against each other and that extend in the D1-direction and at the boundary between the members 11-2 and 11-3. In the welding areas 14-2, the D1-direction is a width direction of the members 11-2 and 11-3. In welding in the welding area 14-2, the laser light L is applied to each of the corner and the boundary and is caused to sweep in the D1-direction. Each of the welding areas 14-2 is provided approximately between both ends of each of the member 11-2 and the member 11-3 in the D1-direction, that is, approximately between one end 11a and another end 11a of each of the member 11-2 and the member 11-3 in the D1-direction. Note that the welding areas 14-2 are two welding areas and are provided on both sides in the thickness direction of the member 11-3; however, the welding areas are not limited to this, and only any one of the two welding areas 14-2 may be provided. When the welding areas 14-2 are provided on both sides in the thickness direction, the joint strength is higher than that in the case where the welding area 14-2 is provided on only one side in the thickness direction and the electric resistance can be further reduced. The two welding areas 14-2 may overlap each other. In the welding area 14-2, the D1-direction is an example of the first direction, the D3-direction is an example of the second direction, and the D2-direction is an example of the third direction.

The welding area 14-3 welds two members 11-3 and 11-4 are welded. Both the members 11-3 and 11-4 extend in the D1-direction and the D2-direction. The members 11-3 and 11-4 are arranged in the D1-direction and are pushed against each other. The welding area 14-3 extends linearly in the D2-direction at the boundary that is formed by the pushing between the members 11-3 and 11-4. In welding in the welding area 14-3, the laser light L is applied to the boundary and is caused to sweep in the D2-direction. The welding area 14-3 is provided approximately between both ends of the member 11-4 in the D2-direction, that is, approximately between one end 11a and another end 11a of the member 11-4 in the D2-direction. Note that the welding areas 14-3 may be provided on both sides in the thickness direction of the member 11-3 and the member 11-4. In the welding area 14-3, the D2-direction is an example of the first direction and the D1-direction is an example of the same direction intersecting with the first direction.

According to such a configuration, because the welding area 14 extends linearly in the first direction and extends approximately between both ends of at least one of the two members 11 that are welded using the welding area 14 in the first direction, the joint strength tends to be higher than that in the case of spot welding.

The busbar 10 exemplified in FIG. 3 includes two platy members 11 that are welded using the welding areas 14 (14-4). Note that the two members 11 are pushed against each other in a state of obliquely intersecting without orthogonality. Also in this case, the welding areas 14-4 extend linearly in the D1-direction approximately between both ends of the two members 11 in the D1-direction. Such a configuration enables the same effect as that obtained in the example illustrated in FIG. 2 by joining the two members 11 using the welding area 14 as in the example illustrated in FIG. 2. Note that the welding areas 14-4 are provided on both sides in the thickness direction of the members 11; however, the welding areas are not limited to this, and only any one of the welding areas 14-4 in the two spots may be provided. When the welding areas 14-4 are provided on both sides in the thickness direction, the joint strength is higher than that in the case where the welding area 14-4 is provided on only one side in the thickness direction.

The busbar 10 exemplified in FIG. 4 includes two platy members 11 that are welded using the welding areas 14 (14-5 and 14-6) at two spots. Note that both the two members 11 extend in the D1-direction and the D2-direction and their ends overlap in the D3-direction. Also in this case, the welding areas 14-5 and 14-6 extend linearly in the D1-direction approximately between both ends of the two members 11 in the D1-direction. Such a configuration enables the same effect as that obtained in the example illustrated in FIG. 2 by joining the two members 11 using the welding area 14 as in the example illustrated in FIG. 2.

In the examples in FIGS. 2 to 4, the members 11 may be extruded materials that are obtained by extrusion molding. The extruded materials are members having approximately a certain cross-sectional shape and are, for example, wire rods, rectangular wires, stripe-shaped and flat members, or the like. It is possible to obtain the members 11 by cutting a base material 20 along the cross-section intersecting with the direction of extrusion (longitudinal direction). According to such a manufacturing method, for example, it is possible to further reduce the time and cost of manufacturing.

Figure 5:
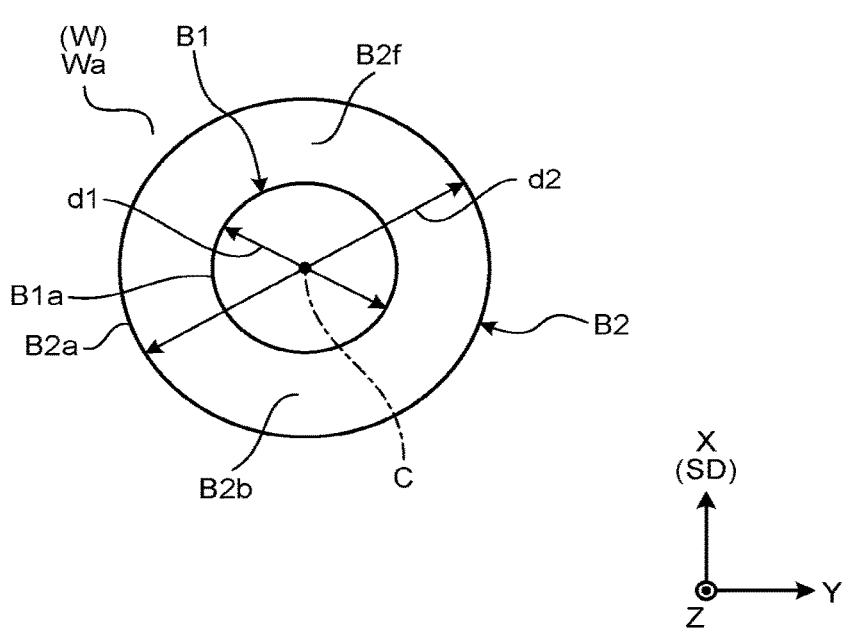
FIG. 5 is an illustrative schematic view illustrating a beam (spot) of laser light that is formed on a surface of the object to be processed by the laser welding device of the embodiment.

FIG. 5 is a schematic view illustrating beams (spot) of the laser lights L that are applied to the plane surface Wa. Each of a beam B1 and a beam B2 has a power distribution in a Gaussian form in a radial direction of a cross-section that is orthogonal to an optical-axis direction of the beam. Note that the power distributions of the beams B1 and B2 are not limited to Gaussian forms. In each diagram like FIG. 5 in which the beams B1 and B2 are presented by circles, the diameters of the circles representing the beams B1 and B2 are beam diameters of the respective beams B1 and B2. The beam diameter of each of the beams B1 and B2 contains a peak of the beam and is defined as a diameter of an area of an intensity equal to or larger than $1/e^2$ of a peak intensity. Although not illustrated in the drawings, in the case of a beam that is not circular, a length of an area of an intensity equal to or larger than $1/e^2$ of a peak intensity in a direction perpendicular to the sweep direction SD can be defined as a beam diameter. A beam diameter on the surface Wa is referred to as a spot diameter.

As illustrated in FIG. 5, in the present embodiment, in an example, the beams of the laser lights L are formed on the surface Wa such that the beam B1 of the first laser light and the beam B2 of the second laser light overlap, the beam B2 is larger (wider) than the beam B1, and an outer edge B2a of the beam B2 surrounds an outer edge B1a of the beam B1. In this case, a spot diameter d2 of the beam B2 is larger than a spot diameter d1 of the beam B1. On the surface Wa, the beam B1 is an example of a first spot and the beam B2 is an example of a second spot.

In the present embodiment, as illustrated in FIG. 5, because the beam (spot) of the laser light L is symmetric with respect to a center point C on the surface Wa, the shape of the spot is the same in a predetermined sweep direction SD. Thus, when a moving system that moves the optical head 120 and the workpiece W relatively is included in order to cause the laser light L to sweep on the surface Wa, the moving system only needs to have a system capable of at least relative translation and a system capable of relative rotation can be omitted in some cases. Both the beams B1 and B2 may be the first laser light or may be the second laser light. The beams may be a single beam of the first laser light or the second laser light.

The two members 11 serving as the workpiece W can be made of a metal material having conductivity. The metal material is, for example, a copper metal material or an aluminum metal material and is, specifically, copper, a copper alloy, aluminum, an aluminum alloy, tin plated copper, a tin plated copper alloy, tin plated aluminum, a tin plated aluminum alloy, or the like. The two members 11 may be made of the same material or may be made of different materials. The plating layer is not limited to tin plating and, for example, other plating, such as nickel plating may be used.

Wavelength and Optical Absorptance

Figure 6:
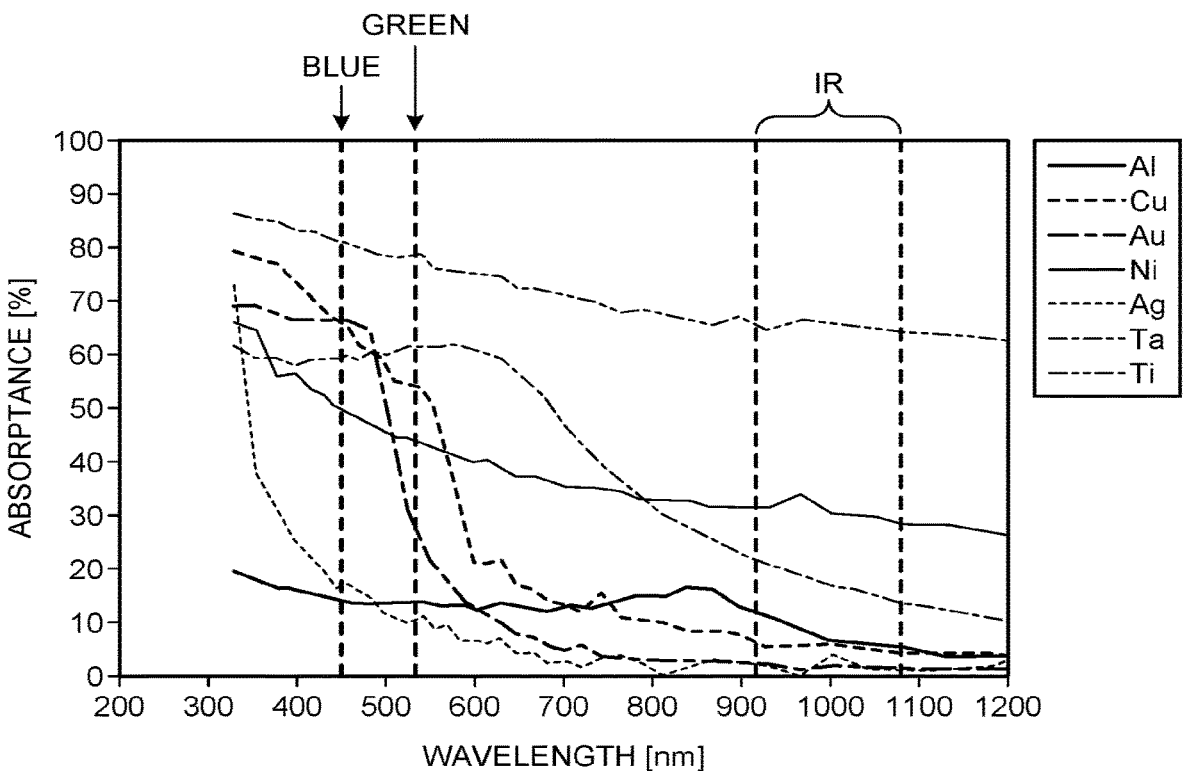
FIG. 6 is a graph presenting optical absorptances of each metal material to the wavelength of laser light that is applied.

Optical absorptances of metal materials will be described here. FIG. 6 is a graph presenting optical absorptances of the respective metal materials with respect to the wavelength of the laser light L that is applied. The horizontal axis of the graph of FIG. 6 represents the wavelength and the vertical axis represents the absorptance. FIG. 6 presents the relationship between the wavelength and the absorptance with respect to aluminum (Al), copper (Cu), gold (Au), nickel (Ni), silver (Ag), tantalum (Ta), and titanium (Ti).

Although the features differ depending on the material, as for each of the metals illustrated in FIG. 6, it can be understood that energy absorptance is higher when laser light of blue or green (the second laser light) is used than when general infrared (IR) laser light (the first laser light) is used. The features are prominent in copper (Cu), gold (Au), etc.

When laser light is applied to the workpiece W whose absorptance with respect to the used wavelength is relatively low, most of the optical energy is reflected and does not have an effect as heat on the workpiece W. For this reason, it is necessary to apply a relatively high power in order to obtain a fusion area having a sufficient depth. In that case, an energy is applied rapidly to the beam center, so that sublimation occurs and a key hole is formed.

On the other hand, when laser light is applied to the workpiece W whose absorptance with respect to the used wavelength is relatively high, most of the applied energy is absorbed into the workpiece W and is converted into a thermal energy. In other words, because it is unnecessary to apply an excessive power, thermally conductive fusion is led without formation of a key hole.

In the present embodiment, a wavelength of the first laser light, a wavelength of the second laser light, and a material of the workpiece W are selected such that the absorptance of the workpiece W with respect to the second laser light is higher than the absorptance with respect to the first laser light. In this case, when the sweep direction is the sweep direction SD illustrated in FIG. 5, because of sweeping of the spot of the laser light L, first of all, the second laser light is applied to a site on which the workpiece W is to be welded (referred to as a site of welding below) using an area B2$f$ of the beam B2 of the second laser light that is positioned on a front side in the SD in FIG. 5. Thereafter, the beam B1 of the first laser light is applied to the site of welding and thereafter the second laser light is applied again using an area B2$b$ of the beam B2 of the second laser light that is positioned on a rear side in the sweep direction SD.

Thus, at the site of welding, first of all, application of the second laser light with the area B2$f$ with respect to which the site of welding has a high absorptance causes a heat transfer fusion area. Thereafter, at the site of welding, application of the first laser light causes a deeper fusion area in a key hole form. In this case, because the heat transfer fusion area is formed previously at the site of welding, it is possible to form a fusion area having a given depth using the first laser light with a lower power than that in the case where the heat transfer fusion area is not formed. Furthermore, thereafter, at the site of welding, application of the second laser light with the area B2$f$ with respect to which the site of welding has a high absorptance changes the fusion state. From such a point of view, the wavelength of the second laser light is preferably equal to or smaller than 550 [nm] and is more preferably equal to or smaller than 500 [nm].

According to experimental researches by the inventors, it was confirmed that it is possible to reduce welding failures, such as a sputtered material and a blow hole, in welding by application of the laser light L of the beams like those in FIG. 5. It can be estimated that this is because heating the workpiece W using the area B2$f$ of the beam B2 previously before the beam B1 reaches more stabilizes a fusion pool of the workpiece W that is formed by the beam B2 and the beam B1.

Welding Method

In welding using the laser processing device 100, first of all, the workpiece W in which the two members 11 are temporarily joined is set such that the laser light L is applied to the surface Wa. With the laser light L being applied to the surface Wa, the laser light L and the workpiece W are caused to move relatively. Accordingly, while being applied to the surface Wa, the laser light L moves (sweeps) in the sweep direction SD on the surface Wa. The part to which the laser light L is applied fuses and is then fixed in association with a decrease in temperature, so that the two members 11 are welded. Welding the two members 11 is performed at least one spot and forms the busbar 10.

DOE

As illustrated in FIG. 1, the optical head 120 includes an DOE 125 between the collimating lens 121-1 and the mirror 123.

Figure 7:
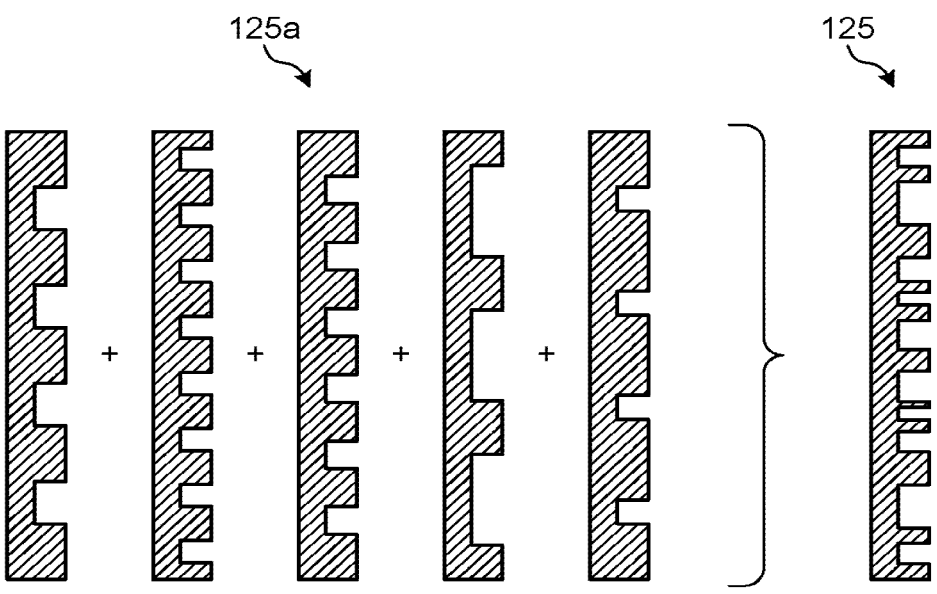
FIG. 7 is an illustrative view illustrating the concept of principle of a diffractive optical element contained in the laser welding device of the embodiment.

The DOE 125 forms a shape of the beam B1 (referred to as a beam shape below) of the first laser light. As conceptually exemplified in FIG. 7, the DOE 125 has a configuration in which a plurality of diffraction gratings 125$a$ with different periods are superimposed. The DOE 125 is able to form a beam shape by curving parallel light to a direction in which each of the diffraction gratings 125$a$ has an effect on the parallel light and superimposing the parallel light. The DOE 125 can be also referred to as a beam shaper.

The optical head 120 may have a beam shaper that is provided on a latter stage with respect to the collimating lens 121-2 and that adjusts a beam shape of the second laser light, a beam shaper that is provided on a latter stage with respect to the filter 124 and that adjusts beam shapes of the first laser light and the second laser light, or the like. Properly adjusting the beam shape of the laser light L with the beam shaper makes it possible to further inhibit occurrence of welding errors in welding. The DOE 125 makes it possible to divide the beam of the first laser light into a plurality of beams. Note that the optical head 120 need not include the DOE 125.

Cross-Section of Welding Area

Figure 8:
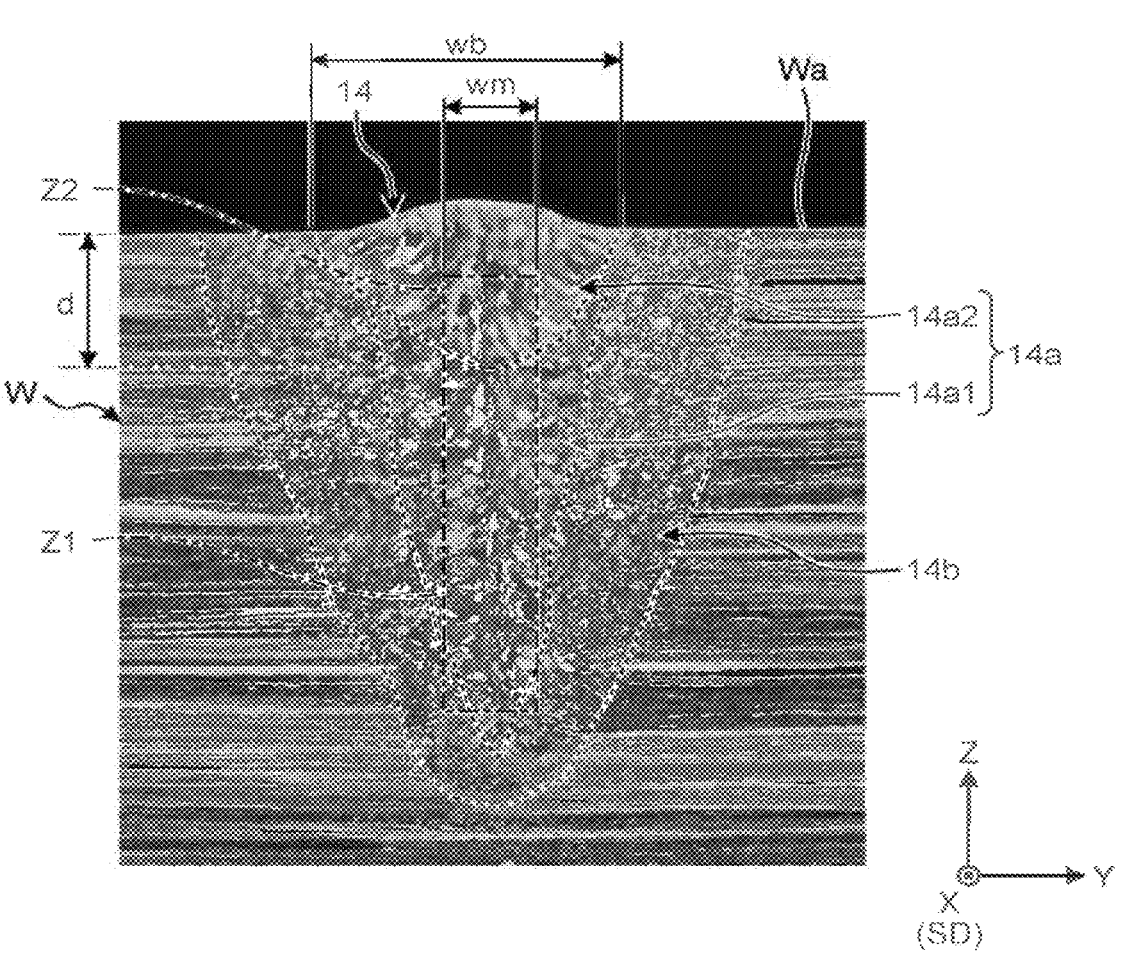
FIG. 8 is an illustrative and schematic cross-sectional view of a welding area of the embodiment.

FIG. 8 is a cross-sectional view illustrating an example of the welding area 14 that is formed in the workpiece W. FIG. 8 illustrates an example in which the laser light L containing the beam B1 of the first laser light and the beam B2 of the second laser light is applied. Note that the mode of cross-section differs depending on the applied laser light.

FIG. 8 is a cross-sectional view that is perpendicular to the sweep direction SD (the X-direction in FIG. 8) and that is along the thickness direction (the Z-direction or the direction of the depth of the welding area 14). The welding area 14 extends also in the sweep direction SD, that is, a direction perpendicular to the plane of FIG. 8. FIG. 8 illustrates a cross-section of the welding area 14 that is formed in the workpiece W that is a single copper plate having a thickness of 2 [mm]. It can be estimated that the mode of the welding area 14 in which the two members 11 are joined is approximately the same as the mode of the welding area 14 that is formed in the workpiece W that is a single metal material illustrated in FIG. 8.

As illustrated in FIG. 8, the welding area 14 includes a welding metal 14$a$ that extends from the surface Wa in the direction opposite to the Z-direction and a thermal effect area 14$b$ that is positioned around the welding metal 14$a$. The welding metal 14$a$ is a site that fuses because of application of the laser light L and afterwards that is set. The welding metal 14$a$ can be also referred to as a fusing and setting area. The thermal effect area 14$b$ is a site on which the base material (base material of welding) of the workpiece W is thermally affected and is a site that does not fuse.

The width of the welding metal 14$a$ along the Y-direction narrows as the width is distant from the surface Wa. In other words, the cross-section of the welding metal 14$a$ has a tapered shape in which the cross-section narrows in the direction opposite to the Z-direction.

The detailed analysis on the cross-section that was made by the inventors proved that the welding metal 14$a$ contains a first site 14$a$1 that is distant from the surface Wa and a second site 14$a$2 between the first site 14$a$1 and the surface Wa1.

The first site 14$a$1 is a site that is obtained by key-hole form fusion using application of the first laser light and the second site 14$a$2 is a site that is obtained by fusion using application of the area B2$b$ in the beam B2 of the second laser light that is positioned on the rear side in the sweep direction SD. The analysis according to EBSD (electron back scattered diffraction pattern) proved that the size of crystal grains differs between the first site 14$a$1 and the second site 14$a$2 and, specifically, the average of cross sections of crystal grains on the second site 14$a$2 is larger than the average of cross sections of crystal grains on the first site 14$a$1 on a cross-section intersecting with the X-direction (the sweep direction SD).

The inventors confirmed that, when only the beam B1 of the first laser light is applied to the workpiece W, that is, when there is no application of the area B2$b$ in the beam B2 that is positioned on the rear side in the sweep direction SD, the second site 14$a$2 is not formed and the first site 14$a$1 extends deeply from the surface Wa in the direction opposite to the Z-direction. In other words, in the present embodiment, because application of the area B2$b$ in the beam B2 that is positioned on the rear side in the sweep direction SD forms the second site 14$a$2 near the surface Wa, it can be estimated that the first site 14a1 is formed on a side opposite to the surface Wa with respect to the second site 14a2, that is, in a position distant from the surface Wa in the direction opposite to the Z-direction.

Figure 9:
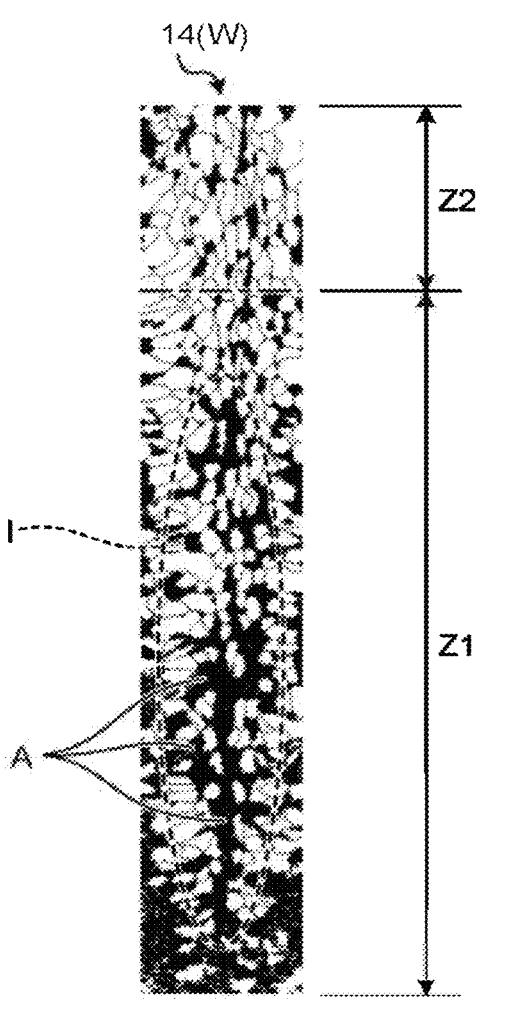
FIG. 9 is an illustrative and schematic cross-sectional view illustrating part of the welding area of the embodiment.
Figure 9:
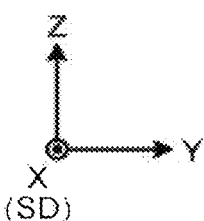

FIG. 9 is a cross-sectional view illustrating an example of part of the welding area 14. FIG. 9 illustrates the border of crystal grains that are obtained by EBSD. In FIG. 9, crystal grains A whose grain size is equal to or larger than 13 [μm] are colored black as an example. Note that 13 [μm] is not a threshold of physical properties and it was set for analysis on the experimental result. It is clear from FIG. 9 that there are relatively a large number of crystal grains A on the first site 14a1 and there are relatively a small number of crystal grains A on the second site 14a2. In other words, the average of the cross-sectional areas of the crystal grains in the second site 14a2 is larger than the average of the cross-sectional areas of the crystal grains on the first site 14a1. Using the experimental analysis, the inventors confirmed that the average of the cross-sectional areas of the crystal grains on the second site 14a2 is 1.8 times the average of the cross-sectional areas of the crystal grains on the first site 14a1 or larger.

As illustrated in the area I in FIG. 9, such crystal grains A having a relatively small size are dense in a state of extending in an elongated manner in the Z-direction in a position distant from the surface Wa in the Z-direction. From the analysis at a plurality of spots in different positions in the X-direction (the sweep direction SD), it was confirmed that the area in which the crystal grains A are dense extends also in the sweep direction SD. Because it is welding with sweeping, it can be estimated that crystals are formed in the same manner in the sweep direction SD.

In the case where it is difficult to discriminate the first site 14a1 and the second site 14a2 from the appearance on the cross-section, a hardness distribution, or the like, a first zone Z1 and a second zone Z2 that are determined geometrically from a position on the surface Wa of the welding metal 14a and a width wb as in FIGS. 8 and 9 may serve as the first site 14a1 and the second site 14a2. In an example, the first zone Z1 and the second zone Z2 are rectangular areas that have a width wm (such as a width in the Y-direction) and that extend in the Z-direction on the cross section orthogonal to the sweep direction SD, the second zone Z2 is a zone from the surface Wa to a depth d in the Z-direction, and the first zone Z1 can be a zone deeper than the depth d, that is, a zone on the opposite side to the surface Wa with respect to the position of the depth d. The width wm can be, for example, one third of a width wb (the average of bead widths) on the surface Wa of the welding metal 14a and the depth of the second zone Z2 (height and thickness) can be a half of the width wb. The depth of the first zone Z1 can be, for example, three times the depth d of the second zone Z2. The inventors confirmed from the experimental analysis on multiple samples that, in setting the first zone Z1 and the second zone Z2, the average of cross-sections of crystal grains in the second zone Z2 is larger than the average of cross-sections of crystal grains in the first zone Z1 and is 1.8 times the average in the first zone Z1. Such discrimination can be an evidence of formation of the first site 14a1 and the second site 14a2 by welding in the welding metal 14a.

Furthermore, the researches including experiments by the inventors proved that the ratio of the depth of the welding area 14 in the direction of thickness (the length of the welding metal 14a in the thickness direction) to the thickness of the thinner one of the two members 11 that are welded using the welding area 14 is preferably 0.8 or larger and is more preferably 0.9 or larger. Forming such deep penetration makes it possible to ensure the joint strength to realize a complicated structure of the busbar 10 and reduce the electric resistance. Furthermore, welding by application of the laser light L containing the first laser light and the second laser light having wavelengths different from each other makes it possible to inhibit occurrence of welding failures, such as a sputtered material and a blow hole.

The thickness of the member 11 is preferably equal to or larger than 0.5 [mm], is more preferably equal to or larger than 1.0 [mm], and is still more preferably equal to or larger than 2.0 [mm]. According to the welding method of the present embodiment, it is possible to enable deeper penetration and thus, in welding of such thick two members 11, it is possible to obtain a more solid joined state and further reduce the electric resistance. Furthermore, welding using application of the laser light L containing the first laser light and the second laser light having wavelengths different from each other makes it possible to inhibit occurrence of welding failures, such as a sputtered material and a blow hole, in welding of such thick two members 11.

As described above, in the busbar 10 of the present embodiment, the welding area 14 in which the two members 11 are welded extends linearly in the first direction and is provided approximately between both ends of at least one of the two members 11 in the first direction.

According to such a configuration, for example, compared to the case where the two members 11 are joined by spot welding, advantages, for example, that the strength of the joining using the welding area 14 can be further increased and the electric resistance in the welding area 14 can be further reduced are obtained. If the busbar 10 is manufactured by pressing, the cost of molds for pressing runs up and thus the cost of manufacturing the busbar 10 and accordingly the cost of manufacturing the busbar 10 and the price of the busbar 10 tend to increase. In this respect, according to the embodiment, because it is possible to form the busbar 10 into a predetermined shape by welding the members 11, an advantage that the busbar 10 can be manufactured at lower costs is obtained.

In the busbar 10 of the present embodiment, for example, both the two members 11-3 and 11-4 that are welded using the welding area 14-3 extending in the D2-direction (the first direction) may extend in the D2-direction and extend in the D1-direction (the same direction) intersecting with the D2-direction, the member 11-1 that is one of the two members 11 that are welded using the welding area 14-1 may extend in the D1-direction (the first direction) and extend in the D2-direction (the second direction) intersecting with the D1-direction, and the member 11-2 that is the other one of the two members 11 may extend in the D1-direction and extend in the D3-direction (the third direction) intersecting with the D1-direction and the D2-direction. As described above, the welding area 14 of the present embodiment is applicable to welding of the two members 11 that are arranged in various postures and therefore it is possible to obtain the busbar 10 in a predetermined shape.

In the busbar 10 of the present embodiment, a plating layer may be provided on the surface of at least one of the two members 11 or fine irregularities (irregular texture) may be provided on the surface of at least one of the two members 11, for example, by surface processing, such as sand blasting, shot-peening, laser processing, or chemical etching. The welding area 14 of the present embodiment is applicable to such joining of the two members 11. According to such a configuration, for example, it is possible to obtain an effect of preventing damages or corrosion because of provision of the plating layer on the surface of the member 11, an effect of increasing heat dissipation because of provision of the fine irregularities on the surface of the member 11, etc. Note that the surface processing of forming the plating layer or the irregularities is preferably performed on the plane member 11 before being welded using the welding area 14. This makes it possible to perform the surface processing more easily than in the case where the surface processing is performed on the assembled busbar 10 or perform the surface processing under a condition suitable to obtain required characteristics per location.

In the method of manufacturing the busbar 10 of the present embodiment, for example, the welding area 14 may be formed by applying laser light containing a plurality of beams. According to such a manufacturing method, for example, it is possible to form the welding area 14 with higher quality in which a sputtered material and a blow hole are reduced because of an effect of pre-warning using a sub-beam that is applied before a main beam.

In the method of manufacturing a busbar of the present embodiment, for example, the beams may be formed by the DOE 125 (beam shaper). According to such a manufacturing method, because it is possible to form the beams from a single laser light, for example, advantages that the laser processing device 100 with a simpler configuration enables higher-quality welding in the welding area 14 and the energy consumption of welding by the laser processing device 100 may be further reduced are obtained.

In the busbar of the present embodiment, the welding area 14 may include the welding metal 14a and the thermal effect area 14b and the welding metal 14a may include the first site 14a1 and the second site 14a2 at which the average of cross-sectional areas of crystal grains in a cross-section along the depth direction of the welding area 14 is larger than that on the first site 14a1.

In the method of manufacturing a busbar of the present embodiment, the beams B1 and B2 may contain the beam B1 of the first laser light having a wavelength between 800 [nm] and 1200 [nm] inclusive and the beam B2 of the second laser light having a wavelength between 400 [nm] and 500 [nm] inclusive.

As described above, the inventors confirmed that, in welding by application of the beams of the laser lights L in which the beams B1 and B2 are formed on the surface Wa, welding failures can be further reduced and the welding metal 14a including the first site 14a1 and the second site 14a2 and the thermal effect area 14b are formed in the welding area 14. It can be estimated that this is because, as described above, heating the workpiece W previously using the area B2f of the beam B2 of the second laser light before the beam B1 of the first laser light reaches further stabilizes the fusion pool of the workpiece W that is formed by the beam B2 and the beam B1. Thus, according to the laser light L including the beams B1 and B2, for example, it is possible to execute higher-quality welding with less welding failures. Such effects are more prominent that in the case where a single laser light is divided by the DOE 125 (beam shaper) and is more prominent when the beams B1 and B2 are further divided by the DOE 125. According to such setting of the beams B1 and B2, for example, an advantage that it is possible to further lower the power of the first laser light is obtained. Furthermore, when the beam B1 and the beam B2 are applied coaxially, an advantage that relative rotation of the optical head 120 and the workpiece W is unnecessary is obtained.

According to the embodiment, for example, each of the two members 11 is made of at least any one a copper metal material and an aluminum metal material. When the busbar 10 is used under an environment with large vibrations, there is a risk that the vibrations would damage the spot of connection between the busbar 10 and other parts. In such a case, making at least one of the members forming the busbar 10 using a material having high elasticity makes it possible to increase flexibility of the busbar 10 and thus inhibit occurrence of an unfavorable event due to vibrations in the busbar 10 and other members that are connected to the busbar 10. In this case, by selecting materials appropriately according to mechanical characteristics and electrical characteristics that are required, it is possible to fabricate the busbar 10 that is more preferable. Note that there are, as the material with high elasticity, for example, phosphor bronze, beryllium copper, C7025, C64770, C18142, C18045, etc.

In the present embodiment, for example, welding in the welding area 14 may be controlled based on images captured by the camera 170. According to such a manufacturing method, it is possible to form the welding area 14 more accurately.

Second Embodiment

Figure 10:
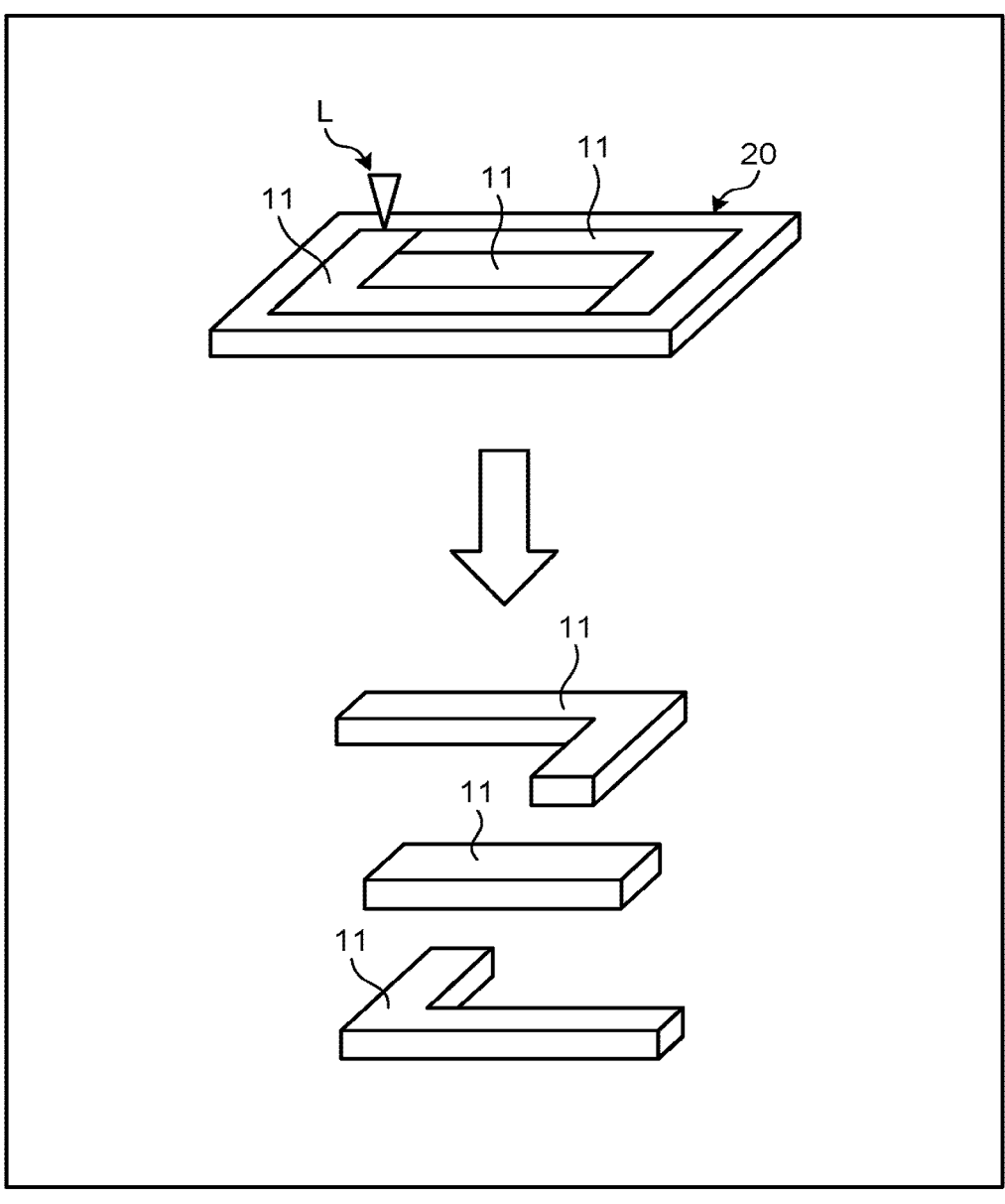
FIG. 10 is an illustrative schematic view illustrating a step of cutting out a plurality of members of a base material by laser cutting in a method of manufacturing a busbar of an embodiment.

FIG. 10 is a perspective view illustrating a method of manufacturing the members 11 of the present embodiment. As illustrated in FIG. 10, it is possible to form the members 11 by cutting the base material 20 (a base material of cutting) by application of a laser light L. If the members 11 are formed by pressing, the cost of molds for pressing runs up and thus the cost of manufacturing the members 11 and the busbar 10 and accordingly the cost of manufacturing the busbar 10 and the price of the busbar 10 tend to increase. In this respect, according to the embodiment, because it is possible to form the members 11 by cutting the base material 20 by laser, an advantage that the members 11 and the busbar 10 can be manufactured at lower costs is obtained.

It is possible to apply the laser light L for cutting the base material 20 by laser to obtain the members 11 from the optical head 120 of the laser processing device 100. In this case, a setting of each unit of the laser processing device 100 is changed between laser cutting on the base material 20 and laser welding on the two members 11, that is, formation of the welding area 14. For example, while only the first laser light (the beam B1) is applied in laser cutting, in laser welding, the first laser light (the beam B1) and the second laser light (the beam B2) are applied and the outputs of the laser devices 111 and 112 can be set smaller than those in laser cutting. The laser processing device 100 may include a gas supply mechanism capable of spraying an inert gas to the workpiece W from the optical head 120 or a nozzle different from the optical head 120 as required in laser cutting. Note that differences in settings in the laser processing device 100 between laser cutting and laser welding are not limited to them.

The embodiments of the disclosure have been exemplified, and the embodiments are an example only and are not intended to limit the scope of the disclosure. The above-described embodiments can be carried out in other various modes and various omissions, replacements, combinations and changes can be made without departing from the scope of the disclosure. Furthermore, specifications such as each configuration and shape (such as the structure, type, direction, model, size, length, thickness, height, number, arrangement, position and material) can be changed as appropriate and be implemented.

For example, when a laser light is caused to sweep on a workpiece, the sweeping may be caused by known wobbling or weaving, output modulation, or the like, to adjust the surface area of a fusion pool.

According to the disclosure, it is possible to obtain a busbar having a much improved and novel configuration and a method of manufacturing the busbar.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A busbar comprising:

a plurality of members that are platy; and a welding area in which two of the members are welded, the welding area being linear and extending in a first direction, the welding area being provided approximately between both ends of at least one of the two members in the first direction, wherein the welding area includes a welding metal; and a thermal effect area that is positioned around the welding metal, wherein the welding metal includes a first site and a second site on which an average of cross sections of crystal grains on a cross-section along a direction of a depth of the welding area is larger than an average of cross sections of crystal grains on the first site on the cross-section along the direction of the depth of the welding area.

2. The busbar according to claim 1, wherein both the two members extend in the first direction and extend in a same direction intersecting with the first direction.

3. The busbar according to claim 1, wherein one of the two members extends in the first direction and extends in a second direction intersecting with the first direction, and another one of the two members extends in the first direction and extends in a third direction intersecting with both of the first direction and the second direction.

4. The busbar according to claim 1, wherein a plating layer is provided on a surface of the at least one of the two members.

5. The busbar according to claim 1, wherein irregularities are provided on a surface of the at least one of the two members.

6. The busbar according to claim 1, wherein each of the members is made of at least any one of a copper metal material and an aluminum metal material.

7. The busbar according to claim 1, wherein a ratio of a depth of the welding area to a thickness of a thinner one of the two members in a direction of the thickness is 0.8 or larger.

8. The busbar according to claim 1, wherein a thickness of each of the members is 0.5 [mm] or larger.

9. The busbar according to claim 1, wherein the average of the cross sections of the crystal grains on the second site is 1.8 times or more the average of the cross sections of the crystal grains on the first site.

* * * * *